Jan. 22, 1952     R. D. SALMON     2,583,017
TYPEWHEEL ARRESTING MECHANISM FOR PRINTING TELEGRAPH APPARATUS
Filed Oct. 23, 1948

INVENTOR.
REGINALD DENNIS SALMON
BY
Robert Harding Jr.
ATTORNEY

Patented Jan. 22, 1952

2,583,017

UNITED STATES PATENT OFFICE 2,583,017

TYPEWHEEL ARRESTING MECHANISM FOR PRINTING TELEGRAPH APPARATUS

Reginald Dennis Salmon, Croydon, England, assignor, by mesne assignments, to Creed and Company, Ltd., Croydon, England, a British company Application October 23, 1948, Serial No. 56,163
In Great Britain October 30, 1947

8 Claims. (Cl. 197—18)

1

This invention relates to printing telegraph apparatus of the kind in which a rotating member, such as a typewheel, is driven through a clutch from a continuously rotating shaft and is brought to rest by means of a stop member. The invention has for its object to provide means for absorbing the kinetic energy of such a driven rotating member when it is brought to rest.

The invention may be regarded as a modification of the invention described and claimed in U. S. Patent No. 2,382,668, issued to me on August 14, 1945, as applied to a typewheel. In the apparatus described in the last mentioned patent, a stop arm was provided for arresting the typewheel when a selected one of a plurality of stops was positioned in the path of the stop arm, and a latch means was connected to the stop arm for preventing rebound of the stop arm from the stop, but the typewheel was resiliently connected to the stop arm and damping means was provided for dissipating the energy of the typewheel.

It is the object of the present invention to provide a modification of the invention described in said patent suitable for use in cases in which the energy of the moving parts to be dissipated is less than in the case formerly described. The present invention is particularly suitable for use with a typewheel in a tape printer.

According to the present invention, two stop arms are provided, separately and resiliently connected to the rotatable member, and means is provided for causing these stop arms to be positioned on opposite sides of a stop member placed in their path. The rotatable member then oscillates about the position defined by the stop member and each stop arm can swing away from and back to the position of the stop member, the energy of the oscillating parts being damped so that the rotatable member is brought to rest in the position defined by the stop member.

The invention may be applied to the absorption of the kinetic energy of a typewheel which is driven through a clutch and selectively stopped in any of a plurality of selectable positions or it may be applied to the exactly analogous problem of the absorption of the kinetic energy of a cam sleeve when stopped in an invariable position at the end of each revolution or half-revolution.

The clutch through which the rotary system is driven may be a friction clutch or may be a positive drive type of clutch such as the ratchet and pawl type described in said patent and in such case the impact of the stop arm with the stop serves to throw out the clutch.

An embodiment of the invention specially suitable for use with a typewheel in a tape-printer

2 will now be described with reference to the accompanying drawings in which:

All the above figures show the type-wheel assembly without the driving clutch.

Figure 1:
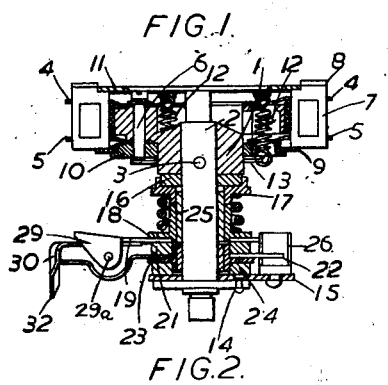
Fig. 1 is a cross section on the line A—A of Fig. 2.
Figure 2:
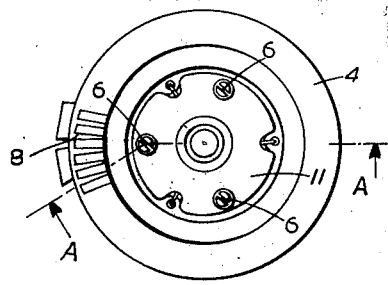
Fig. 2 is an end elevation.
Figure 3:
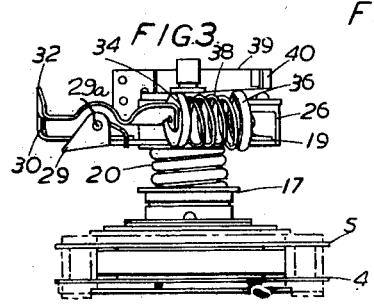
Fig. 3 is a side elevation.
Figure 4:
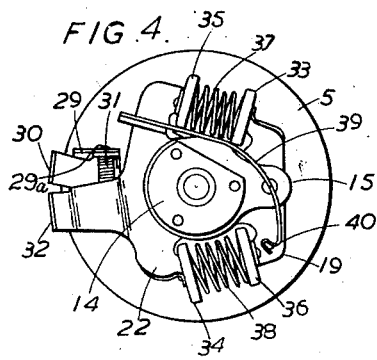
Fig. 4 is an elevation of the opposite end from that of Fig. 2.
Figure 5:
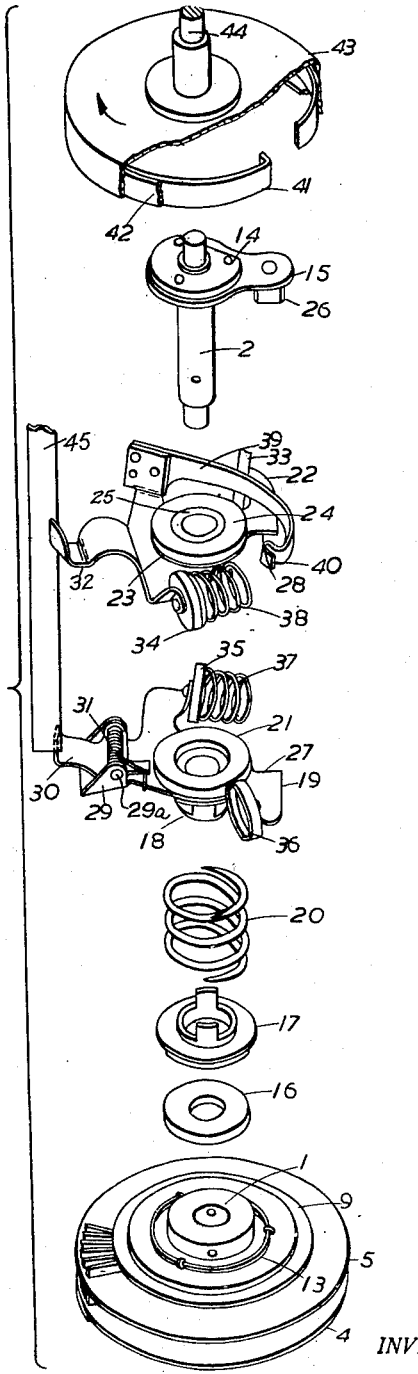

Fig. 5 shows parts of the type-wheel assembly and the driving clutch in exploded relation.

Referring to the drawings the type-wheel consists of a central boss 1 fixed to a spindle 2 by a pin 3. Annular discs 4 and 5 are fastened to the boss 1 by screws 6 and are provided with slots in which fit type bars 7 provided with type faces 8. These type bars are adapted to be moved by a printing hammer for the purpose of printing and are held with their rear faces against an annular plate 9 fixed to an annular disc 10. The disc 10 is secured to the boss 1 by the screws 6. The means for holding the type bars 7 comprises a disc 11 bearing against flanges on the faces of the bars 7 and held thereagainst by three springs 12 which are anchored below the disc 10 by a wire ring 13. The spring held disc 11 serves to return a type bar 7 to normal position after it has been struck by the printing hammer.

At the opposite end of the spindle 2 to that to which the boss 1 is fixed is a flange 14 formed integrally with the spindle 2 and a plate 15 is riveted to this flange 14, and the other parts of the type-wheel are held around the spindle 2 between the boss 1 and the plate 15.

Against the boss 1 is a friction washer 16 which fits in a collar 17, which in turn is keyed to a member 18. Fixed to member 18, e. g. by riveting, is a plate 19 and compressed between plate 19 and collar 17 is a coil spring 20. A washer 21 lies between plate 19 and a plate 22 which latter is fixed to a member 23, whilst a washer 24 separates member 23 from plate 15. Collar 17 and members 18 and 23 are spaced away from spindle 2 by bushings 25. These bushes and the washers 16, 21 and 24 are composed of self lubricating bearing material.

A pin 26 is fixed to plate 15 and in the assembled structure fits between edges 27 and 28 on plates 19 and 22 respectively. Plate 19 is formed with ears 29 between which is fitted a pivot pin 29a for a latch projection 30 held in position by a spring 31 coiled round the said pivot pin. Plate 22 is formed with an integral projection 32 that constitutes a stop arm. Fixed to plate 22 are shallow cups 33 and 34 lying in planes perpendicular to the plane of the plate 22. Similarly fixed to plate 19 are similar shallow cups 35 and 36. In the assembled structure a coil spring 37 is lightly compressed between cup 35 on plate 19 and cup 33 on plate 22 whilst another coil spring 38 is lightly compressed between cup 34 on plate 22 and cup 36 on plate 19.

An arm 39 bent in an arc as shown is fixed to an upturned portion of plate 22 and ends in a hook 40. This hook 40 is engaged by a complementary hook on a spring band 41 which makes frictional connection, through the intermediary of a fabric band 42 containing some lubricant, with the interior of a cup shaped head 43 fixed to a shaft 44 adapted to be driven by an electric motor (not shown).

In operation, the shaft 44 and the cup shaped member 43 are rotated and drive the band 41, this arrangement constituting a friction clutch. The band 41, being hooked to the member 39, drives the plate 22. The edge 20 of the plate 22 abuts against the pin 26 and in consequence the shaft 2 and the remainder of the assembly are rotated.

Situated around and concentric with the spindle 2 is a stationary series of stop members, each member being capable of being selectively moved into the path of rotation of the stop arm 32 and the latch 30. One of these stops is shown at 45 in Fig. 5 as having been moved into selected position. Accordingly, as the assembly is rotating in the direction of the arrow in Fig. 5, the latch 30 first contacts with the stop 45, but is so shaped that it rides over this stop. Immediately it has done so, stop arm 32 abuts against the stop 45, this stop arm and the latch 30 engaging opposite faces of the stop 45. The arrest of the stop arm 32 causes the above mentioned friction clutch to be disengaged, that is the cup shaped member 43 continues to be rotated but is unable to drive the spring band 41. As, however, the type-wheel possesses energy of motion, it continues to rotate in the same direction and overshoots the stopping position. The pin 26, engaging the edge 27 of the plate 19, carries this plate with it and causes the latch 30 to swing away from the stop 45.

The springs 37 and 38 are thereby compressed and the type-wheel comes to rest and then rotates in the opposite direction. As it does so, the pin 26, engaging edge 28 of the plate 22, carries the stop arm 32 away from the stop 45, springs 37 and 38 being again compressed. The energy of rotation of the type-wheel is dissipated by friction between the plates 19 and 22 with washer 21, between washer 24 and plate 15, and between the surfaces of the friction washer 16 and the collar 17 and boss 1. The typewheel rapidly comes to rest. It has been found that with the arrangements shown, about 1½ complete oscillations of sufficient amplitude to be visible to the eye are executed before the typewheel comes to rest.

As explained in said patent the angular velocity given to the typewheel is such as to allow of the type-wheel making a complete rotation in a fraction between 0.65 and 0.75 of the time allowed in the apparatus between successive selections of a stop such as 45.

While the principles of the invention have been described above in connection with specific embodiments, and particular modifications thereof, it is to be clearly understood that this description is made only by way of example and not as a limitation on the scope of the invention.

What is claimed is:

1. Printing telegraph apparatus comprising a rotatable member, a continuously rotating shaft, a clutch for driving said rotatable member from said shaft, two stop arms separately resiliently connected to said rotatable member, a stop member for defining a stopping position for said rotatable member, means for bringing said stop member into the path of said stop arms, means for causing said stop arms to be positioned on opposite side of said stop member when in the path of said stop arms and means for bringing said rotatable member to rest in the position defined by said stop member.

2. Printing telegraph apparatus as claimed in claim 1 comprising latch means mounted on one of said stop arms so shaped as to ride over said stop member upon impact therewith during movement in one direction of rotation only and spring means for restoring said latch means to original position after said impact.

3. Printing telegraph apparatus as claimed in claim 1 comprising springs mounted between said two stop arms in a state of compression.

4. Printing telegraph apparatus comprising a typewheel, a continuously rotating shaft, a friction clutch for driving said typewheel from said shaft, two stop arms separately resiliently connected to said typewheel, a stop member for defining a stopping position for said typewheel, means for causing said stop arms to be positioned on opposite sides of said stop member, and means for bringing said typewheel to rest in the position defined by said stop member.

5. Printing telegraph apparatus comprising a typewheel, a continuously rotating shaft, friction clutch means for driving said typewheel from said shaft, a stop member for defining a stopping position for said typewheel, a first stop arm resiliently connected to said typewheel, a second stop arm resiliently connected to said typewheel, springs held in compression between said stop arms, means for causing said stop arms to be positioned on opposite sides of said stop member, and friction surfaces between said stop arms and between one of said stop arms and said typewheel whereby on arrest of said stop arms by said stop member the said stop arms and typewheel are brought to rest after a limited amount of oscillation in the position defined by said stop member.

6. Printing telegraph apparatus as claimed in claim 5 in which each of said stop arms is fixed to a plate, said plates being spaced apart by a friction washer having self lubricating faces.

7. Printing telegraph apparatus as claimed in claim 6 in which a compression spring is held between one of said plates and a collar keyed thereto and a friction washer having self lubricating faces is held between said collar and said typewheel.

8. Printing telegraph apparatus comprising a typewheel having a drive pin affixed thereto, a continuously rotating shaft, a stop member for defining a stopping position for said typewheel, a first stop arm connected to a first plate, a second stop arm connected to a second plate, both said plates resiliently connected to said typewheel, spring means held in compression between said stop arms, means for causing said stop arms to be positioned on opposite sides of said stop member, a first friction washer disposed between said plates, a second friction washer disposed between said first plate and said typewheel, said drive pin disposed between opposed edges of said plates, and friction clutch means coupling said first plate with said shaft, said first plate adapted to drive said typewheel by contact of an edge thereof against said drive pin, said second plate adapted to be driven by said drive pin by contact of said pin against an edge of said second plate, whereby on said first stop arm being arrested by said stop member, said typewheel overshoots and compresses said spring means causing said typewheel to oscillate and to drive the respective stop arms during respective half oscillations, thereby to bring said typewheel and said stop arms to rest in the position defined by said stop member.

REGINALD DENNIS SALMON.

REFERENCES CITED

The following references are of record in the file of this patent:

UNITED STATES PATENTS

| Number | Name | Date |
|---|---|---|
| 1,905,090 | Griffith | Apr. 25, 1933 |
| 2,382,668 | Salmon | Aug. 14, 1945 |